United States Patent
Tokuda et al.

(10) Patent No.: US 7,035,724 B2
(45) Date of Patent: Apr. 25, 2006

(54) VEHICULAR CONTROL DEVICE AND METHOD OF CONTROLLING THE SAME

(75) Inventors: Takeshi Tokuda, Toyota (JP); Akito Oonishi, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 73 days.

(21) Appl. No.: 10/642,631

(22) Filed: Aug. 19, 2003

(65) Prior Publication Data

US 2004/0044456 A1 Mar. 4, 2004

(30) Foreign Application Priority Data

Aug. 27, 2002 (JP) ....................... 2002-247687

(51) Int. Cl.
*F16H 61/20* (2006.01)
*F02D 13/02* (2006.01)
*F02D 41/22* (2006.01)

(52) U.S. Cl. ............................ 701/54; 701/48; 477/114
(58) Field of Classification Search .................. 701/48, 701/51, 53, 54, 65; 477/115, 114
See application file for complete search history.

(56) References Cited

U.S. PATENT DOCUMENTS 5,369,581 A * 11/1994 Ohsuga et al. ................ 701/48
5,704,873 A * 1/1998 Iwata et al. .................. 477/115
6,039,673 A * 3/2000 Mikami et al. ................ 477/93
6,270,443 B1 * 8/2001 Ito et al. ...................... 477/114
6,352,061 B1 * 3/2002 Takahashi ................. 123/90.15
6,533,704 B1 * 3/2003 Saito et al. ................... 477/92
6,645,122 B1 * 11/2003 Ishiguro et al. ............. 477/120
2001/0049575 A1 * 12/2001 Muratomi ..................... 701/62
2003/0232696 A1 * 12/2003 Shibagaki .................... 477/76

FOREIGN PATENT DOCUMENTS

JP     10-115237 A      5/1998
JP     2000-205393   *  7/2000

* cited by examiner

*Primary Examiner*—Michael J. Zanelli
(74) *Attorney, Agent, or Firm*—Oblon, Spivak, McClelland, Maier & Neustadt, P.C.

(57) ABSTRACT

A driving force generated by an engine is transmitted to driving wheels (not shown) via an automatic transmission. The engine is provided with an electronically controlled throttle body and the like. An E-ECU performs cooperative control when necessary, so that an output of the engine is obtained in accordance with a load applied thereto. On the other hand, the automatic transmission is provided with a torque converter. Even in the case where the aforementioned predetermined condition has been fulfilled in a T-ECU, if the E-ECU detects a deterioration in performance of the electronically controlled throttle body or the like, the performance of neutral control is prohibited.

12 Claims, 7 Drawing Sheets

VEHICULAR CONTROL DEVICE AND METHOD OF CONTROLLING THE SAME

INCORPORATION BY REFERENCE

The disclosure of Japanese Patent Application No. 2002-247687 filed on Aug. 27, 2002, including the specification, drawings, and abstract is incorporated herein by reference in its entirety.

BACKGROUND OF THE INVENTION

1. Field of the Invention

The invention relates to a vehicular control device and a vehicular control method for a vehicle in which power is transmitted to driving wheels via an automatic transmission.

2. Description of the Related Art

For example, in a vehicle employing an internal combustion engine as a power source, a driving force generated thereby is transmitted to a drive shaft via an automatic transmission. In order to stop such a vehicle with the automatic transmission in a running (D) range in which a driving force is transmitted to the drive shaft, a driver or the like of the vehicle usually performs an operation of depressing a brake pedal or the like so as to prevent the vehicle from moving forwards due to a creeping force. In this state, the engine carries out work corresponding to a load of the creeping force. Fuel consumed to carry out the work constitutes a major factor leading to a deterioration in practical fuel consumption in the engine installed in the vehicle as a whole.

In order to reduce an amount of fuel consumed during such stoppage of the vehicle in the D range, there is known an art in which a target rotational speed of a control device for controlling an operational state of the engine is reduced during stoppage of a vehicle in a D range (Japanese Patent Application Laid-Open No. 10-115237). However, reduction of a target rotational speed of an engine during stoppage of a vehicle in a D range through adoption of such an art also affects stability of an idling state. In this case, namely, although fuel consumption is improved, the engine is not always in its desirable operational state. Especially when an auxiliary requiring a large load such as an onboard air-conditioner or the like is driven, there is also an apprehension that stability of an idling state will deteriorate.

Further, in order to reduce an amount of fuel consumed during stoppage of the vehicle in the aforementioned D range, there is also known an art wherein so-called neutral control, which is designed to set an automatic transmission in a substantially neutral state for inhibiting generation of a creeping force, is performed under a predetermined condition (e.g., Japanese Published Patent No. 63-35869). By performing this neutral control during stoppage of the aforementioned vehicle in the D range, the amount of fuel consumed due to generation of an unnecessary creeping force is reduced. Therefore, practical fuel consumption in the engine installed in the vehicle as a whole is enhanced.

In a vehicle mounted with an engine in which the aforementioned neutral control is performed, various engine control operations such as adjustment of an amount of intake air or adjustment of timings for opening or closing valves in the engine are usually performed as well with a view to operating the engine more efficiently or at a higher output. That is, while an output of the engine is determined depending on circumstances in which the engine control operations are performed, a load applied to the engine is determined depending on circumstances in which the aforementioned neutral control is performed. Accordingly, if the aforementioned neutral control is performed irrespective of circumstances in which the engine control operations are performed, stable operation of the engine may become impossible owing to fluctuations in load applied to the engine.

The status quo described hitherto generally holds true not only for a vehicle employing an internal combustion engine as a power source but also for a vehicle which is provided with an automatic transmission and a power source and in which the performance of the aforementioned neutral control brings about fluctuations in load applied to the power source.

SUMMARY OF THE INVENTION

It is an object of the invention to provide a vehicular control device and a vehicular control method capable of ensuring smoother operation of a power source while achieving enhancement of practical fuel consumption of a vehicle by reducing an amount of fuel consumed by the power source during stoppage of the vehicle.

In a first aspect of the invention, there is provided a vehicular control device for a vehicle in which a driving force generated by a power source is transmitted to driving wheels via an automatic transmission whose power transmission efficiency is variable, wherein an operating mode is controlled for the power source and wherein neutral control for rendering an input frictional engagement element of the transmission in a released or slipping state is performed for the automatic transmission when the vehicle is stopped while being in a running range in which a driving force delivered from the power source is transmitted to the driving wheels by the automatic transmission. In this vehicular control device, prohibition of performance of neutral control for the automatic transmission is controlled on the basis of a predetermined condition regarding operating-mode control performed for the power source.

According to the aforementioned first aspect, prohibition of performance of neutral control for the automatic transmission is controlled on the basis of the predetermined condition regarding operating-mode control performed for the power source. That is, it is determined, in accordance with a circumstance in which operating-mode control is performed for the power source, whether or not neutral control to be performed for the automatic transmission can be performed. Thus, the amount of fuel consumed by the power source during stoppage of the vehicle is reduced by performing the neutral control. As a result, the power source can be operated more smoothly.

In a second aspect of the invention, the power source of the aforementioned first aspect is an internal combustion engine.

According to the second aspect, the internal combustion engine is employed as the power source of the aforementioned first aspect. Therefore, it is determined, in accordance with a circumstance in which engine control is performed for the internal combustion engine, whether or not the neutral control to be performed for the automatic transmission can be performed. Thus, the amount of fuel consumed by the internal combustion engine during stoppage of the vehicle is reduced by performing the neutral control. As a result, the internal combustion engine can be operated more smoothly.

In a third aspect of the invention, cooperative control for adjusting an increase or decrease in output of the engine in accordance with a load required for the driving wheels in the vehicle is performed in performing the operating-mode control of the aforementioned second aspect, and the predetermined condition regarding the engine control is determined on the basis of detection of a factor threatening to hinder performance of the cooperative control during performance thereof.

According to the aforementioned third aspect, cooperative control for adjusting an increase or decrease in output of the engine in accordance with a load required for the driving wheels in the vehicle is performed in performing the operating-mode control of the aforementioned second aspect, and the predetermined condition regarding the engine control is determined on the basis of detection of a factor threatening to hinder performance of the cooperative control during performance thereof. Therefore, performance of the neutral control is prohibited if it is foreseen that performance of the cooperative control will be hindered.

In a fourth aspect of the invention, the factor threatening to hinder performance of the cooperative control in the aforementioned third aspect is a deterioration in performance of an electronically controlled throttle that adjusts an amount of air sucked into the engine.

According to the aforementioned fourth aspect, if performance of the cooperative control is hindered as a result of a deterioration in performance of the electronically controlled throttle of the aforementioned third aspect, performance of the neutral control is prohibited. It is to be noted herein that the deterioration in performance of the electronically controlled throttle may include inoperativeness thereof.

In a fifth aspect of the invention, the factor threatening to hinder performance of the cooperative control in the aforementioned third aspect is a deterioration in performance of an engine valve open-close timing change mechanism that adjusts timings for opening or closing engine valves for actuating the internal combustion engine.

According to the aforementioned fifth aspect, if performance of the cooperative control is hindered as a result of a deterioration in performance of the engine valve open-close timing change mechanism of the aforementioned third aspect, performance of the neutral control is prohibited. It is to be noted herein that the deterioration in performance of the engine valve open-close timing change mechanism may include inoperativeness thereof.

In a sixth aspect of the invention, the factor threatening to hinder performance of the cooperative control in the aforementioned third aspect is a deterioration in performance of at least one of an air amount sensor that detects an amount of air introduced into combustion chambers of the engine and a coolant temperature sensor for coolant for cooling the engine.

According to the aforementioned sixth aspect, if performance of the cooperative control is hindered as a result of a deterioration in performance of at least one of the air amount sensor and the coolant temperature sensor of the aforementioned third aspect, performance of the neutral control is prohibited. It is to be noted herein that the deterioration in performance of at least one of the air amount sensor and the coolant temperature sensor may include inoperativeness of at least one of them.

In a seventh aspect of the invention, performance of the neutral control is prohibited if a factor threatening to hinder performance of the cooperative control of the aforementioned third aspect is detected during performance thereof.

According to the aforementioned seventh aspect, if a factor threatening to hinder performance of the cooperative control of the aforementioned third aspect is detected during performance thereof, performance of the neutral control is prohibited. Therefore, if some inconvenience is caused in performing the cooperative control, performance of the neutral control is prohibited. As a result, the engine can be operated more smoothly.

In an eighth aspect of the invention, performance of the neutral control is prohibited if at least one of a factor threatening to hinder performance of the cooperative control in the aforementioned third aspect and a factor threatening to cause a deterioration in vehicular performance through performance of the neutral control is detected.

According to the aforementioned eighth aspect, performance of the neutral control is prohibited in at least one of a case where some inconvenience has been caused in performing the cooperative control of the aforementioned third aspect and a case where vehicular performance has deteriorated through performance of the neutral control. As a result, the engine can be operated more smoothly.

In a ninth aspect of the invention, performance of the neutral control is prohibited if a factor threatening to hinder performance of the cooperative control of the aforementioned third aspect and a factor threatening to cause a deterioration in vehicular performance through performance of the neutral control are detected.

In a tenth aspect of the invention, prohibition of performance of the neutral control is abstained from if a factor threatening to cause a deterioration in vehicular performance through performance of the neutral control has not been detected even in the case where a factor threatening to hinder performance of the cooperative control of the aforementioned third aspect has been detected.

In an eleventh aspect of the invention, there is provided a vehicular control device for a vehicle in which a driving force generated by a power source is transmitted to driving wheels via an automatic transmission whose power transmission efficiency is variable, wherein an operating mode is controlled for the power source and wherein neutral control for rendering an input frictional engagement element of the transmission in a released or slipping state is performed for the automatic transmission when the vehicle is stopped while being in a running range in which a driving force delivered from the power source is transmitted to the driving wheels by the automatic transmission. In this vehicular control device, performance of the neutral control for the automatic transmission is prohibited on the condition that a factor threatening to cause a deterioration in vehicular performance through performance of the neutral control be detected.

According to the aforementioned eleventh aspect, performance of the neutral control for the automatic transmission is prohibited on the condition that a factor threatening to cause a deterioration in vehicular performance through performance of the neutral control be detected. Therefore, vehicular performance can be inhibited to the utmost from deteriorating.

In a twelfth aspect of the invention, the factor threatening to cause a deterioration in vehicular performance in the aforementioned eleventh aspect is determined on the basis of at least one of a bed temperature of a catalyst disposed in an exhaust passage of the internal combustion engine so as to purify exhaust gas flowing through the exhaust passage and a temperature of coolant for cooling the engine.

According to the aforementioned twelfth aspect, performance of the neutral control is prohibited if a deterioration in vehicular performance occurs as a result of at least one of a bed temperature of the catalyst and a temperature of the coolant in the aforementioned eleventh aspect. If the bed temperature of the catalyst is low, a deterioration in the function of purifying exhaust gas is considered as a deterioration in performance of the vehicle. If the coolant is at a low temperature, a deterioration in the function of warming a cabin or the like of the vehicle is considered as a deterioration in performance of the vehicle.

In a thirteenth aspect of the invention, there is provided a vehicular control method for a vehicle in which a driving force generated by a power source is transmitted to driving wheels via an automatic transmission whose power transmission efficiency is variable. This method comprises the steps of controlling an operating mode for the power source, performing, for the automatic transmission, neutral control for rendering an input frictional engagement element of the transmission in a released or slipping state when the vehicle is stopped while being in a running range in which a driving force delivered from the power source is transmitted to the driving wheels by the automatic transmission, and controlling prohibition of performance of the neutral control for the automatic transmission on the basis of a predetermined condition regarding operating-mode control performed for the power source.

According to the aforementioned thirteenth aspect, prohibition of performance of the neutral control for the automatic transmission is controlled on the basis of a predetermined condition regarding the operating-mode control performed for the power source. Thus, the amount of fuel consumed by the power source during stoppage of the vehicle is reduced by performing the neutral control. As a result, the power source can be operated more smoothly.

In a fourteenth aspect of the invention, there is provided a vehicular control method for a vehicle in which a driving force generated by a power source is transmitted to driving wheels via an automatic transmission whose power transmission efficiency is variable. In addition to the steps of controlling an operating mode for the power source and performing, for the automatic transmission, neutral control for rendering an input frictional engagement element of the transmission in a released or slipping state when the vehicle is stopped while being in a running range in which a driving force delivered from the power source is transmitted to the driving wheels by the automatic transmission, the method comprises the step of prohibiting performance of the neutral control for the automatic transmission on the condition that a factor threatening to cause a deterioration in vehicular performance through performance of the neutral control be detected.

According to the aforementioned fourteenth aspect, performance of the neutral control is prohibited on the condition that a factor threatening to cause a deterioration in vehicular performance through performance of the neutral control be detected. Therefore, vehicular performance can be inhibited to the utmost from deteriorating.

In another aspect of the invention, the automatic transmission is so constructed as to include a fluid clutch in any one of the aforementioned aspects. A power transmission efficiency of the automatic transmission is variable through adjustment of an amount of fluid to be contained in the fluid clutch.

According to the aspect mentioned above, in the vehicle provided with the automatic transmission whose power transmission efficiency can be changed by adjusting an amount of fluid to be contained in the fluid clutch, each of the vehicular control devices described above can be constructed appropriately.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENT

Hereinafter, one embodiment in which a vehicular control device in accordance with the invention is applied to a vehicle that is mounted with an internal combustion engine as a power source will be described with reference to FIGS. 1 to 6.

Figure 1:
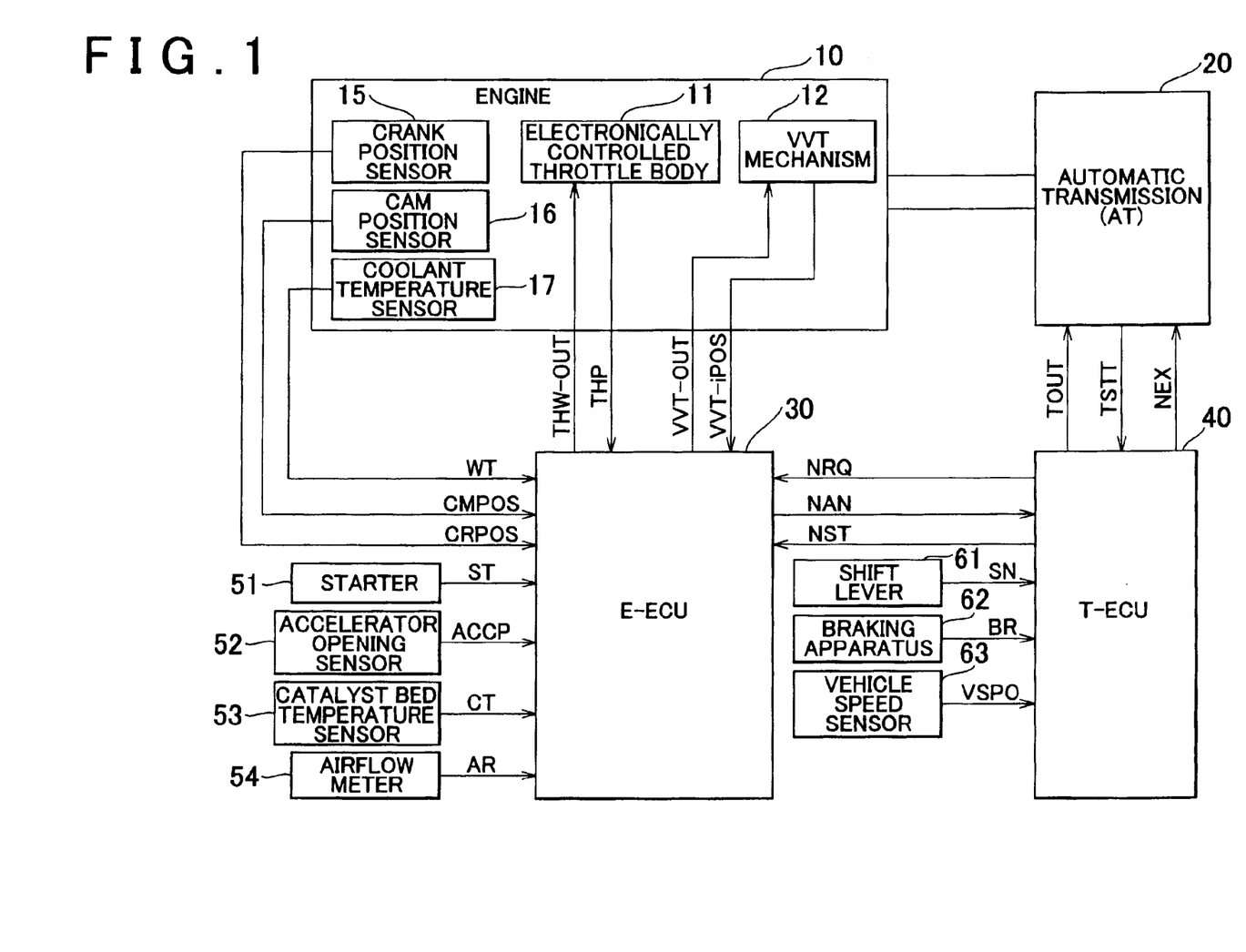
FIG. 1 is a block diagram showing an overall arrangement of a vehicular control device in accordance with one embodiment of the invention.

FIG. 1 is a block diagram showing an overall arrangement of the vehicular control device of this embodiment. In the vehicle, as shown in FIG. 1, a driving force generated by an internal combustion engine (engine) 10 is transmitted to driving wheels of the vehicle (not shown) via an automatic transmission (AT) 20. States of the engine 10 and the AT 20 are controlled by an engine electronic control unit (E-ECU) 30 and a transmission electronic control unit (T-ECU) 40 respectively.

The engine 10 mentioned above is provided with an electronically controlled throttle body 11. The E-ECU 30 controls an opening of a throttle valve (not shown) disposed in an intake pipe, namely, an amount of air sucked into combustion chambers in the engine. Further, the engine 10 is provided with an engine valve open-close timing change (VVT) mechanism 12 that changes timings for opening or closing valves in the engine. The electronically controlled throttle body 11 is controlled by the E-ECU 30, whereby an opening of the throttle valve is adjusted. The VVT mechanism 12 is controlled by the E-ECU 30, whereby timings for opening or closing the valves in the engine are adjusted. As a result, the engine 10 is operated with higher efficiency and higher output.

On the other hand, the AT 20 is an automatic transmission that is constructed by integrating a torque converter with a gear type transmission. The torque converter receives a driving force generated by the engine 10 and transmits it to the output side utilizing a coupling effect of fluid. The T-ECU 40 controls an amount of fluid to be contained in the torque converter, whereby a power transmission efficiency as the automatic transmission is adjusted.

In order to control an operating state of the engine 10 mentioned above, the E-ECU 30 exchanges various signals with respective vehicular components including various sensors mounted in the engine 10, and performs various calculations on the basis of the exchange of those signals.

That is, the engine 10 is provided with a crank position sensor 15 for detecting a crank angle CRPOS of a crank shaft as an engine output shaft, a cam position sensor 16 for detecting a rotational angle CMPOS of each of cams for driving the valves in the engine in an opening or closing direction, and a coolant temperature sensor 17 for detecting a coolant temperature WT of coolant for cooling the engine. Signals that are output from these sensors to indicate a state of the engine 10 are input to the E-ECU 30 mentioned above. A rotational speed of the engine 10, working angles of the cams, and the like are calculated on the basis of those signals. Further, an actuating signal ST of a starter 51 for activating the engine, an output signal ACCP of an accelerator opening sensor 52, an output signal CT of a catalyst bed temperature sensor 53, and an output signal AR from an airflow meter 54 are input to the E-ECU 30 from respective portions of the vehicle. The accelerator opening sensor 52 outputs a signal corresponding to a position of an accelerator pedal operated by a driver of the vehicle. The catalyst bed temperature sensor 53 detects a bed temperature of a catalyst disposed in an exhaust pipe and outputs the detected temperature as an electric signal. The airflow meter 54 detects an amount of intake air in an intake pipe and outputs the detected amount as an electric signal.

Using the signals that are input as described above, the E-ECU 30 performs control for the electronically controlled throttle body 11 and the VVT mechanism 12. First of all, the E-ECU 30 adjusts an amount of air sucked into the combustion chambers in the engine as follows. That is, the E-ECU 30 receives a signal input from the accelerator opening sensor 52, and calculates a command value for the opening (throttle opening) of the throttle valve disposed in the intake pipe on the basis of the signal thus input and current states of the engine 10 and the vehicle. The E-ECU 30 outputs the thus-calculated command value for throttle opening as a command signal THW-OUT for the electronically controlled throttle body 11. In the electronically controlled throttle body 11, a throttle opening is adjusted on the basis of the command signal THW-OUT thus output from the E-ECU 30. The throttle opening at this moment is detected by a throttle position sensor, and a detection signal THP delivered therefrom is output to the E-ECU 30.

In addition to a command signal THW-OUT to be output to the electronically controlled throttle body 11, the E-ECU 30 outputs a command signal VVT-OUT to the VVT mechanism 12 that changes timings for opening or closing the valves in the engine. Thus, timings for opening or closing the valves in the engine are adjusted in accordance with the command signal VVT-OUT, and a state signal VVT-iPOS indicating a state of the VVT mechanism 12 at this moment is output to the E-ECU 30.

In order to control a state of the AT 20, on the other hand, a shift lever signal SH delivered from a shift lever 61, a brake signal BR delivered from a braking apparatus 62, and a vehicle speed signal VSPD delivered from a vehicle speed sensor 63 for detecting a running speed of the vehicle (vehicle speed) are input to the T-ECU 40. The T-ECU 40 outputs a command signal TOUT for a shift range of the AT 20 on the basis of the signals thus input, and detects a result obtained from the command signal TOUT as a state signal TSTT indicating a state of the AT 20.

When the vehicle of this embodiment is stopped while being in a running range in which a driving force delivered from the engine 10 is transmitted to the driving wheels (not shown) by the AT 20, control for reducing power transmission efficiency of the AT 20, namely, so-called neutral control for rendering an input frictional engagement element of the transmission in a released or slipping state is performed. The T-ECU 40 performs neutral control of this embodiment while communicating with the E-ECU 30.

Figure 2:
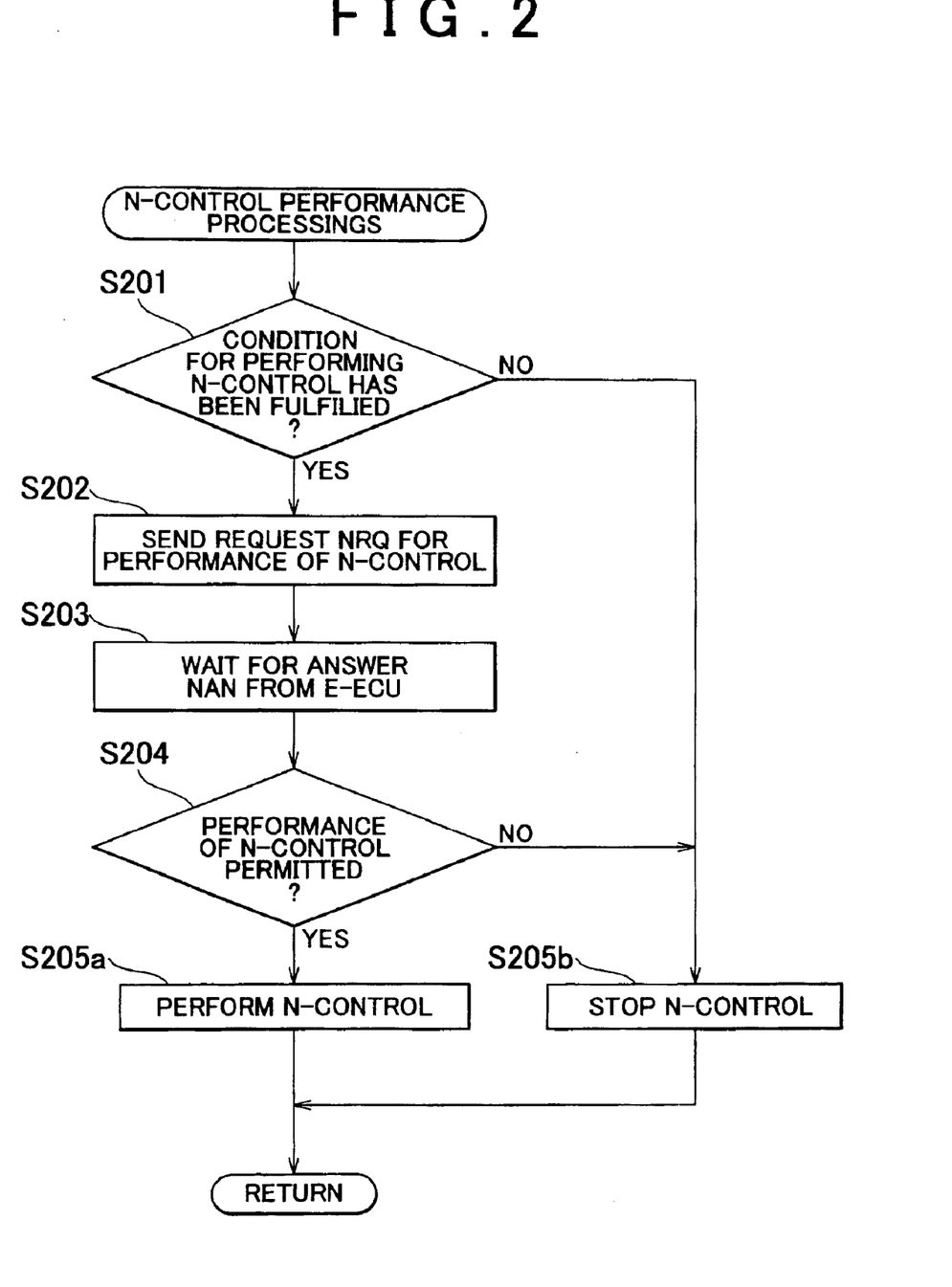
FIG. 2 is a flowchart showing a procedure of neutral control performance processings performed by a T-ECU of the embodiment.

FIG. 2 illustrates, as a flowchart, a procedure of neutral control performance processings, which are basic processings of neutral control performed by the T-ECU 40. In FIG. 2 and other drawings mentioned hereinafter, "neutral control" is abbreviated as "N-CONTROL".

In performing the aforementioned neutral control performance processings, as shown in FIG. 2, the T-ECU 40 determines first of all whether or not a condition for performing neutral control has been fulfilled in the AT 20 (step S201). In step S201, the aforementioned condition may be that the vehicle be stopped, namely, that the vehicle be at a speed of "zero". Alternatively, the aforementioned condition may be that the shift range of the AT 20 be a running (D) range, that the braking apparatus 62 be operated, or the like. If this condition has been fulfilled in step S201, the T-ECU 40 sends a request NRQ for the performance of neutral control to the E-ECU 30 (step S202, see FIG. 1). On the other hand, if the aforementioned condition has not been fulfilled in step S201, the T-ECU 40 refrains from sending a request NRQ for the performance of neutral control to the E-ECU 30, and stops and withholds neutral control (step S205$b$).

If the processing in step S202 is performed, the T-ECU 40 waits for an answer NAN from the E-ECU 30 (step S203). In the meantime, the E-ECU 30 determines, on the basis of states of the engine 10 and the vehicle, whether or not the performance of neutral control is possible, and sends a result of this determination to the T-ECU 40 as the answer NAN. After the answer NAN has thus been sent from the E-ECU 30, the T-ECU 40 determines whether or not the answer NAN permits the performance of neutral control (step S204). If it is determined in step S204 that the answer NAN permits the performance of neutral control, the T-ECU 40 outputs a command NEX (see FIG. 1) for the performance of neutral control to the AT 20, and outputs a state signal NST (see FIG. 1) indicating that neutral control is being performed to the E-ECU 30 (step S205$a$).

The T-ECU 40 thus communicates with the E-ECU 30, whereby neutral control is appropriately performed in accordance with states of the engine 10 and the vehicle. Neutral control performance determination processings, which are performed by the E-ECU 30 in response to a request NRQ for the performance of neutral control in step S202, will now be described with reference to a flowchart shown in FIG. 3.

Figure 3:
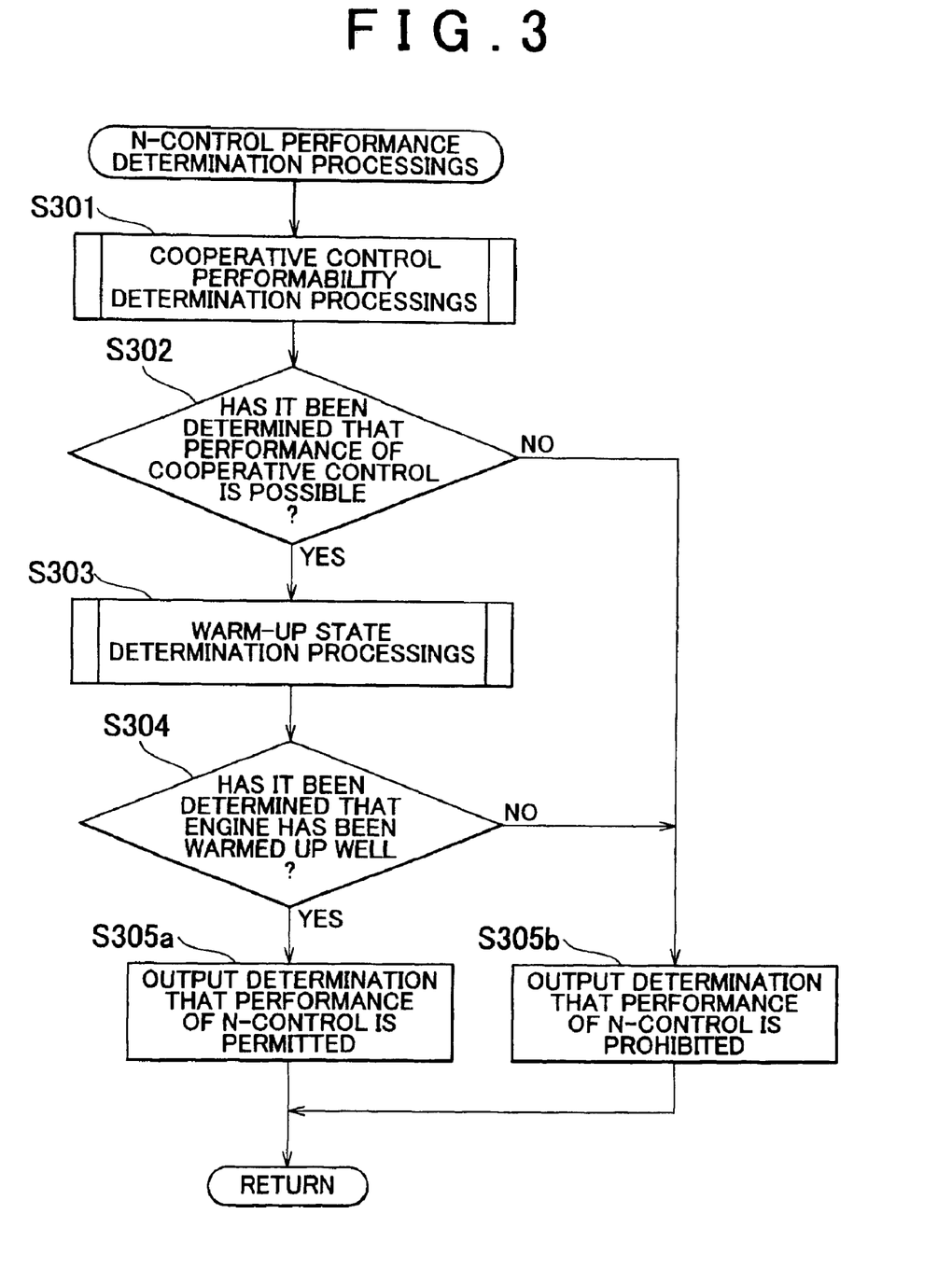
FIG. 3 is a flowchart showing a procedure of neutral control performance determination processings performed by an E-ECU of the embodiment.

As shown in FIG. 3, first of all in operating the engine 10, the E-ECU 30 performs cooperative control performability determination processings for determining whether or not cooperative control is possible (step S301). It is to be noted herein that cooperative control signifies control for operating the engine 10 in a cooperative manner so as to ensure that an output corresponding to a required load is obtained. As an example of such cooperative control, when the load applied to the engine 10 changes due to a change of the shift range of the AT 20, the output of the engine 10 is adjusted by changing the command signal THW-OUT for the electronically controlled throttle body 11 in accordance with a change in the load. The cooperative control performability determination processings in step S301 will be detailed later.

After the aforementioned cooperative control performability determination processings have been performed, the E-ECU 30 determines whether or not the performance of cooperative control is possible (step S302). If it is determined as a result that the performance of cooperative control is impossible, the E-ECU 30 outputs an instruction to prohibit the performance of neutral control to the T-ECU 40 as an answer NAN for a request NRQ for the performance of neutral control (step S305b).

On the other hand, if it is determined in step S302 that the performance of cooperative control is possible, the E-ECU 30 subsequently performs warm-up state determination processings of determining whether or not the respective portions of the vehicle have been warmed up well (step S303). After the aforementioned warm-up state determination processings have been performed, the E-ECU 30 determines whether or not the respective portions of the vehicle have been warmed up well (step S304). Incidentally, the warm-up state determination processings in step S303 will be described later as well. If it is determined in step S304 that the respective portions of the vehicle have been warmed up well, the E-ECU 30 outputs an instruction to permit the performance of neutral control to the T-ECU 40 as an answer NAN for a request NRQ for the performance of neutral control (step S305a). If it is determined in step S304 that the respective portions of the vehicle have not been warmed up well, the control operation is shifted to step 305b where an instruction to prohibit the performance of neutral control is output to the T-ECU 40.

Figure 4A:
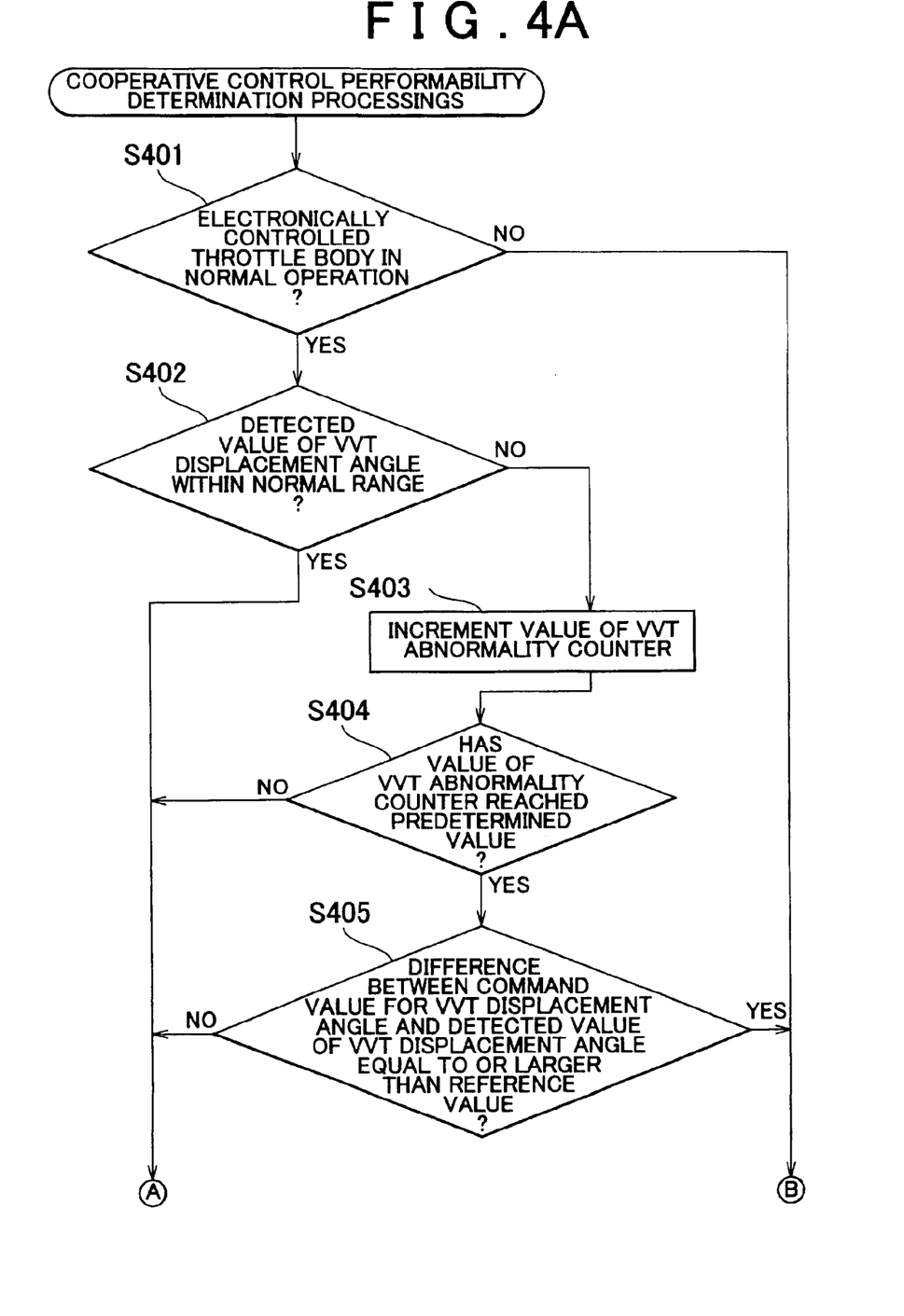
FIG. 4 is a flowchart showing a procedure of cooperative control performability determination processings performed by the T-ECU mentioned above.
Figure 4B:
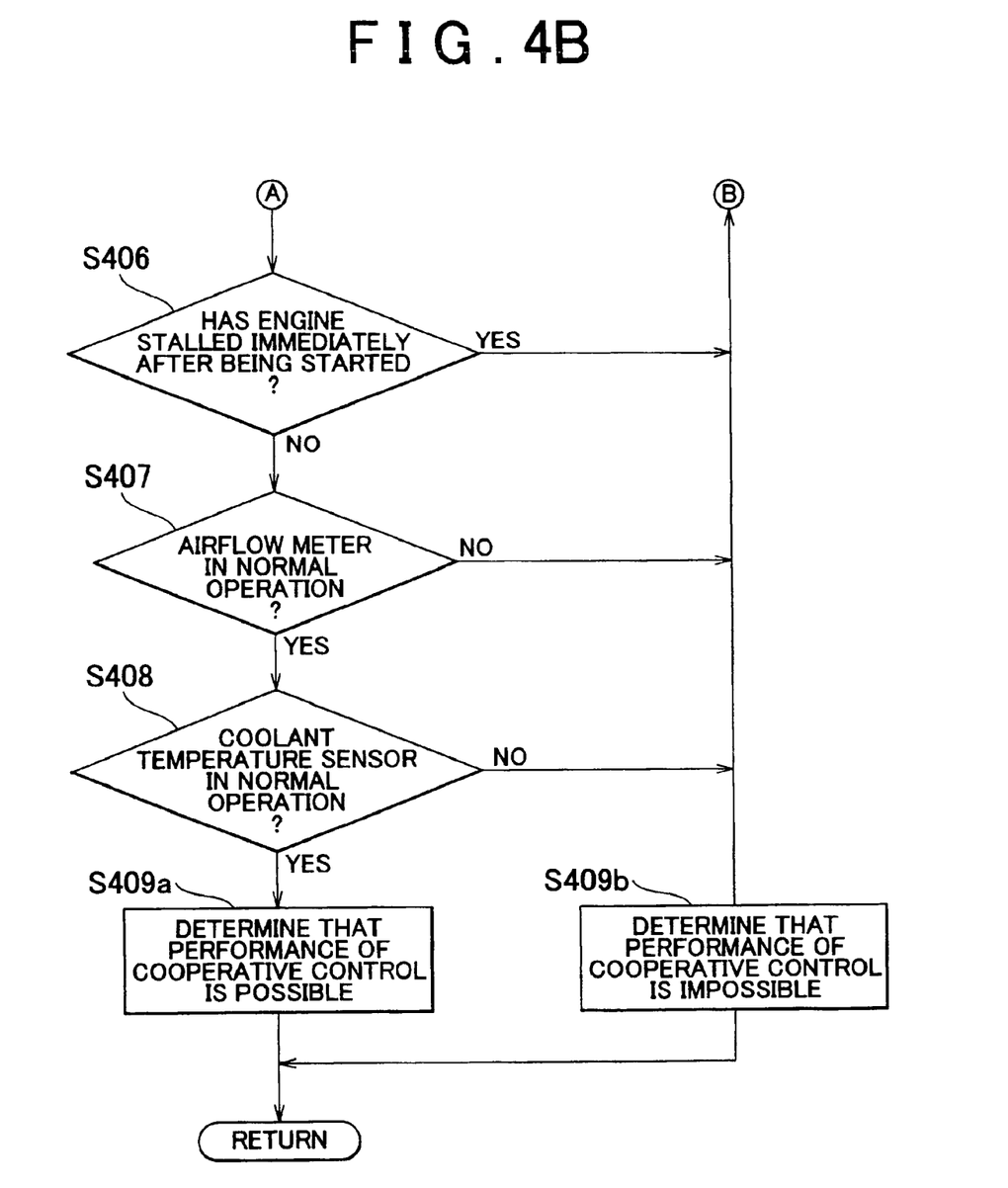

Next, the cooperative control performability determination processings performed by the E-ECU 30 in step S301 will be described with reference to a flowchart shown in FIG. 4. As shown in FIG. 4, the E-ECU 30 first of all determines whether or not the electronically controlled throttle body 11 is in normal operation (step S401). This determination in step S401 is made, for example, depending on whether or not a detection signal THP output from the throttle position sensor of the electronically controlled throttle body 11 indicates a value equal to or smaller than a predetermined value, or depending on whether or not a difference between the value indicated by the detection signal THP and a value indicated by a command signal THW-OUT for the detection signal THP is equal to or larger than a predetermined value. Alternatively, this determination is made, for example, depending on whether or not the E-ECU 30 can normally read out a detection signal THP generated by the throttle position sensor. If it is determined in step S401 that the electronically controlled throttle body 11 is in normal operation, the E-ECU 30 subsequently determines in steps S402 to S405 whether or not the VVT mechanism 12 is in normal operation. If it is determined in step S401 that the electronically controlled throttle body 11 is not in normal operation, the E-ECU 30 determines that the performance of cooperative control is impossible (step S409b). As soon as it is determined that the electronically controlled throttle body 11 is not in normal operation, it is determined that the performance of cooperative control is impossible. This is because the electronically controlled throttle body 11 ranks high in importance when performing cooperative control.

In steps S402 to S405, on the other hand, it is determined as follows whether or not the VVT mechanism 12 is in normal operation. First of all, it is determined whether or not a VVT displacement angle calculated from a state signal VVT-iPOS detected from the VVT mechanism 12 is within a normal range (step S402). If the VVT displacement angle is within the normal range, the E-ECU 30 shifts the control operation directly to step S406 where other processings regarding a determination on the performability of cooperative control are performed. If it is determined in step S402 that the VVT displacement angle is not within the normal range, the E-ECU 30 increments a value of a VVT abnormality counter stored therein (step S403). Then, the E-ECU 30 determines whether or not the thus-incremented value of the VVT abnormality counter has reached a predetermined value (step S404). If the value of the VVT abnormality counter has reached the predetermined value in step S404, the E-ECU 30 determines whether or not a difference between the value indicated by the state signal VVT-iPOS detected from the VVT mechanism 12 and the value indicated by the command signal VVT-OUT for the VVT mechanism 12 is equal to or larger than a reference value (step S405). If it is determined in step S405 that the difference is equal to or larger than the reference value, the E-ECU 30 returns the control operation to step S409b where it is determined that the performance of cooperative control is impossible. Further, if it is determined that the difference is not equal to or larger than the reference value, the E-ECU 30 shifts the control operation to step S406 where processings regarding a determination on the performability of cooperative control are continued. That is, if there is an abnormality occurring in the VVT mechanism 12, a value of the VVT abnormality counter is incremented every time the cooperative control performability determination processings are performed. If the value of the VVT abnormality counter reaches the aforementioned reference value in due course, it is determined that the performance of cooperative control is impossible. Further, even if a detected value of the VVT displacement angle happens to be out of the normal range once, it is not immediately determined for this reason that the performance of cooperative control is impossible. This is because the VVT mechanism 12 is structurally so complicated that a determination on abnormality cannot be made easily and that the determination must not be made on the spot, although not only the electronically controlled throttle body 11 mentioned above but also the VVT mechanism 12 plays a very important role in performing cooperative control.

If it has not been determined up to step S405 that the performance of cooperative control is impossible, the E-ECU 30 advances the control operation to step S406 where it is additionally confirmed whether or not the VVT mechanism 12 is in normal operation. That is, the E-ECU 30 determines first of all whether or not the engine 10 has ever stalled in the past immediately after being started, on the basis of flags and the like that are stored into a storage unit or the like provided in the E-ECU 30 on the basis of signals output from the starter 51, the crank position sensor 15, and the like (step S406). If the engine 10 has never stalled immediately after being started, the E-ECU 30 determines that the VVT mechanism 12 is in normal operation, and advances the control operation to step S407. On the other hand, if the engine 10 has stalled immediately after being started, the E-ECU 30 determines that the VVT mechanism 12 is not in normal operation, shifts the control operation to step S409b, and determines that the performance of cooperative control is impossible.

Subsequently, the E-ECU 30 performs other processings regarding cooperative control. That is, the E-ECU 30 determines first of all whether or not the airflow meter 54 is in normal operation, on the basis of a signal AR output therefrom (step S407). In this case, the E-ECU 30 advances the control operation to step S408 if it is determined that the airflow meter 54 is in normal operation, while the E-ECU 30 shifts the control operation to step S409b and determines that the performance of cooperative control is impossible if it is determined that the airflow meter 54 is not in normal operation. Furthermore, the E-ECU 30 determines on the basis of a coolant temperature WT detected by the coolant temperature sensor 17 whether or not the coolant temperature sensor 17 is in normal operation (step S408). In this case, if it is determined that the coolant temperature sensor 17 is in normal operation, the E-ECU 30 determines that the performance of cooperative control is possible (step S409a). Conversely, if it is determined that the coolant temperature sensor 17 is not in normal operation, the E-ECU 30 shifts the control operation to step S409b and determines that the performance of cooperative control is impossible.

Figure 5:
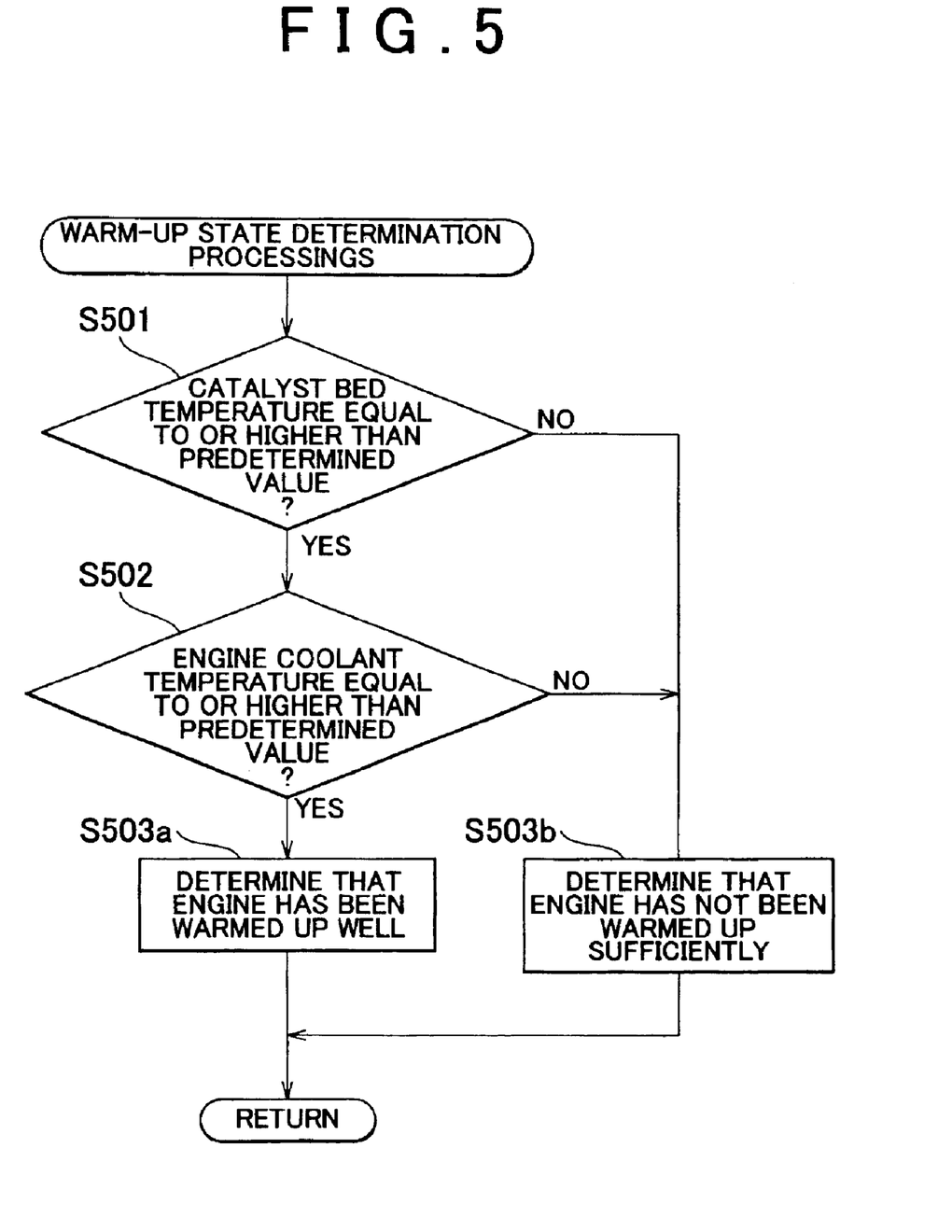
FIG. 5 is a flowchart showing a procedure of warm-up state determination processings performed by the T-ECU.

If it is thus determined in the aforementioned cooperative control performability determination processings that the performance of cooperative control is possible, the E-ECU 30 performs the aforementioned warm-up state determination processings (step S303 in FIG. 3). FIG. 5 is a flowchart showing a procedure of the warm-up state determination processings performed by the E-ECU 30.

As shown in FIG. 5, the E-ECU 30 determines first of all whether or not a catalyst bed temperature detected by the catalyst bed temperature sensor 53 is equal to or higher than a predetermined value (step S501). The E-ECU 30 advances the control operation to step S502 if it is determined in step S501 that the catalyst bed temperature is equal to or higher than the predetermined value, while the E-ECU 30 shifts the control operation to step S503b and determines that the engine has not been warmed up sufficiently if it is determined that the catalyst bed temperature is not equal to or higher than the predetermined value. In addition, the E-ECU 30 determines whether or not an engine coolant temperature detected by the coolant temperature sensor 17 is equal to or higher than a predetermined value (step S502). In this case, if it is determined that the engine coolant temperature is equal to or higher than the predetermined value, the E-ECU 30 determines that the engine has been warmed up well (step S503a). Conversely, if it is determined that the engine coolant temperature is not equal to or higher than the predetermined value, the E-ECU 30 shifts the control operation to step S503b and determines that the engine has not been warmed up sufficiently.

Thus, while the T-ECU 40 for controlling the AT 20 communicates with the E-ECU 30 for controlling the engine 10, the aforementioned neutral control is performed. Temporal transitions of the control performed in this case are illustrated by a time chart in FIG. 6.

Figure 6A:
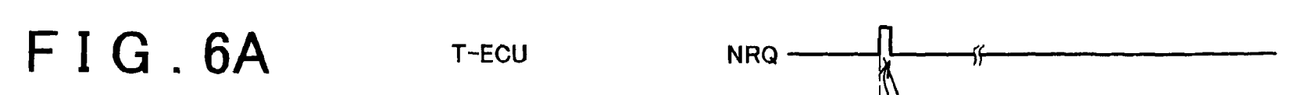
FIGS. 6A to 6G are timing charts showing transitions of states during performance of neutral control of the aforementioned embodiment.
Figure 6B:
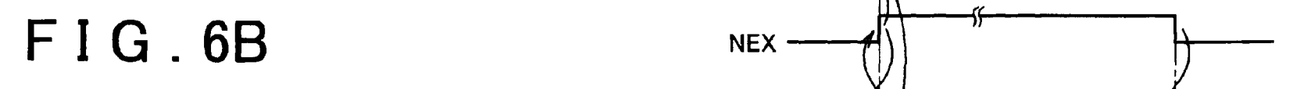
Figure 6C:
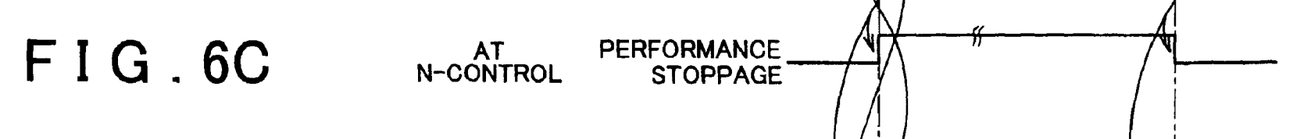
Figure 6D:
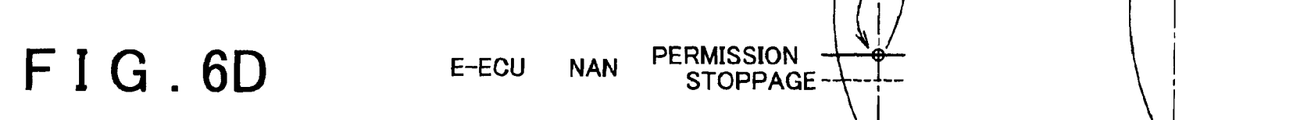
Figure 6E:
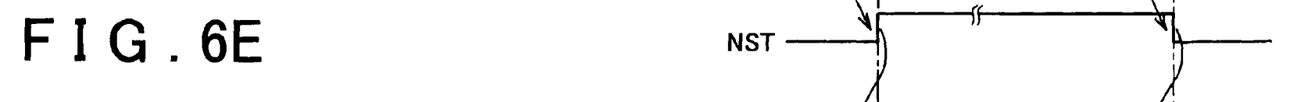
Figure 6F:
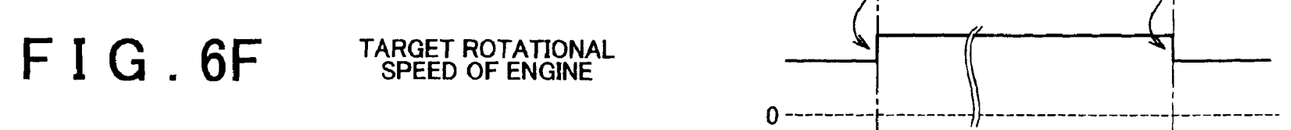
Figure 6G:
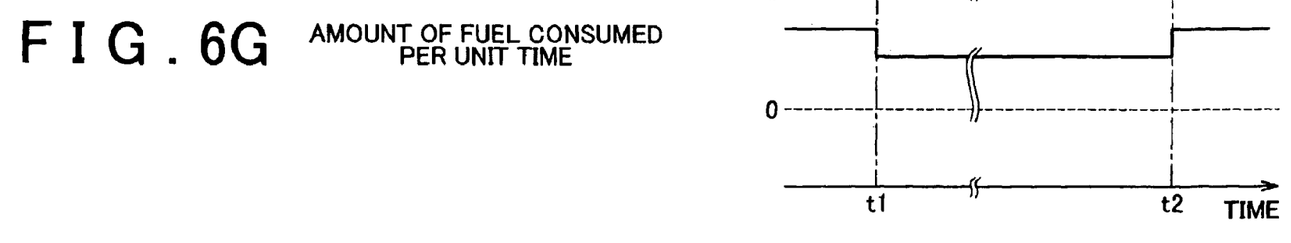

First of all, if it is determined at a timing t1 that the condition of performing neutral control has been fulfilled, the T-ECU 40 sets a request NRQ for the performance of neutral control for the E-ECU 30 (FIG. 6A). In response, the EECU 30 performs the neutral control performance determination processings shown in FIG. 3, determines whether or not states of the engine 10 and the vehicle at that moment permit the performance of neutral control (FIG. 6D), and notifies the T-ECU 40 of a result of the determination. In this case, if a notification that the performance of neutral control is permitted has been received, the T-ECU 40 sets a command NEX for the performance of neutral control for the AT 20 (FIG. 6B), and the AT 20 performs neutral control (FIG. 6C). By setting a signal NST, the T-ECU 40 notifies the E-ECU 30 that neutral control is being performed (FIG. 6E). While the signal NST is set, namely, while neutral control is being performed in the AT 20, the E-ECU 30 holds a target rotational speed of the engine 10 at a predetermined increased value (FIG. 6F). This is a measure that is taken in response to a decrease in load applied to the engine 10 through the performance of neutral control and for the purpose of stabilizing an idling state of the engine 10. In this state, although the target rotational speed of the engine 10 has been increased, the load applied to the engine 10 has been reduced. Therefore, the amount of fuel consumed per unit time is smaller during this period than prior to the timing t1 when the performance of neutral control is started (FIG. 6G).

If the condition of performing neutral control has not been fulfilled at a timing t2, the T-ECU 40 resets a command NEX for the performance of neutral control for the AT 20 (FIG. 6B), and stops neutral control (FIG. 6C). Also, the T-ECU 40 notifies the E-ECU 30 that the signal NST has been reset and that neutral control has been stopped (FIG. 6E). In response, the E-ECU 30 returns the target rotational speed of the engine 10 to a value assumed prior to the timing t1 (FIG. 6F). Thus, the amount of fuel consumed per unit time is also returned to a value assumed prior to the timing t1 (FIG. 6G).

Incidentally, neutral control is stopped not only in the case where the aforementioned T-ECU 40 detects that the condition of performing neutral control has not been fulfilled but also in the case where the E-ECU 30 outputs an instruction to prohibit the performance of neutral control. In this case as well, the performance of neutral control is stopped substantially according to the same procedure as described above.

As described hitherto, the vehicular control device in accordance with this embodiment makes it possible to achieve the following effects.

(1) If the E-ECU 30 determines that the electronically controlled throttle body 11 for adjusting an amount of intake air in the engine 10 using electronic means is not in normal operation, the T-ECU 40 is prohibited from performing neutral control for the AT 20. Thus, while the performance of neutral control achieves enhancement of practical fuel consumption in the vehicle as a whole, the performance of neutral control is prohibited to allow smoother operation of the engine 10 if a deterioration in performance of the electronically controlled throttle body 11 causes an inconvenience in performing cooperative control.

(2) If the E-ECU 30 determines that the VVT mechanism 12 for adjusting timings for opening or closing the valves in the engine 10 is not in normal operation, the T-ECU 40 is prohibited from performing neutral control for the AT 20. Thus, while the performance of neutral control achieves enhancement of practical fuel consumption in the vehicle as a whole, the performance of neutral control is prohibited to allow smoother operation of the engine 10 if a deterioration in performance of the VVT mechanism 12 causes an inconvenience in performing cooperative control. In determining whether or not the VVT mechanism 12 is in normal operation, even if a VVT displacement angle detected from the VVT mechanism 12 is not within a normal range, it is not immediately determined for this reason that the VVT mechanism 12 is not normal. Instead, it is counted how many times the detected VVT displacement angle has deviated from the normal range. After the number of times of deviation of the VVT displacement angle from the normal range has reached a predetermined value, it is determined that the VVT mechanism 12 is not normal. For example, therefore, in the case where the VVT mechanism 12 is actually in normal operation although it has been determined owing to the temporary influence of noise that a detected value of the VVT displacement angle is out of the normal range, the performance of neutral control is prevented from being prohibited through an erroneous determination.

(3) If the E-ECU 30 determines that at least one of the airflow meter 54 for detecting an amount of air introduced into the combustion chambers of the engine 10 and the coolant temperature sensor 17 for detecting a temperature of coolant for cooling the engine 10 is not in normal operation, the T-ECU 40 is prohibited from performing neutral control for the AT 20. Thus, the performance of neutral control achieves enhancement of practical fuel consumption in the vehicle as a whole. Further, if a deterioration in performance of at least one of the airflow meter 54 and the coolant temperature sensor 17 causes an inconvenience in performing cooperative control, the performance of neutral control is prohibited to allow smoother operation of the engine 10.

(4) If the E-ECU 30 determines that at least one of a bed temperature of the catalyst for purifying exhaust gas in the engine 10 and a temperature of coolant for the engine is not equal to or higher than a corresponding one of the predetermined values, the T-ECU 40 is prohibited from performing neutral control for the AT 20. Thus, the performance of neutral control achieves enhancement of practical fuel consumption in the vehicle as a whole. Conversely, if at least one of the bed temperature of the exhaust gas purification catalyst and the temperature of engine coolant is not equal to or higher than a corresponding one of the predetermined values, the performance of neutral control is prohibited to raise the temperature to the corresponding one of the predetermined values as soon as possible. Accordingly, the vehicular performance can be inhibited to the utmost from deteriorating due to a low bed temperature of the aforementioned catalyst or a low coolant temperature.

It is to be noted herein that the aforementioned embodiment may be implemented after being subjected to the following modifications. Although the aforementioned embodiment deals with a case where the E-ECU 30 and the T-ECU 40 control the engine 10 and the AT 20 respectively and operate in a cooperative manner through mutual communication, the invention is not necessarily limited to such a construction. For example, the E-ECU 30 and the T-ECU 40 may be constructed as a single electronic control unit. In short, any construction is acceptable as long as the performance of neutral control for the AT 20 can be prohibited when a predetermined condition regarding control performed for the engine 10 is satisfied.

The aforementioned embodiment exemplifies a construction in which the performance of neutral control is prohibited when it is determined that at least one of the electronically controlled throttle body 11, the VVT mechanism 12, the airflow meter 54, and the coolant temperature sensor 17 is not in normal operation in the case where these members are associated with cooperative control of the engine 10. However, if at least one of these members does not substantially hinder the performance of cooperative control despite abnormal operation, it is not absolutely required that the member subject to abnormal operation be reckoned in as a factor requiring prohibition of the performance of neutral control. Further, if there is another member regarding the performance of cooperative control, it may be reckoned in as a factor requiring prohibition of the performance of the aforementioned neutral control whether or not that member is in normal operation.

The aforementioned embodiment exemplifies a construction in which the performance of neutral control is prohibited if it is determined that at least one of a catalyst bed temperature and an engine coolant temperature is not equal to or higher than a corresponding one of the predetermined values in the case where both the temperatures constitute factors leading to a deterioration in vehicular performance. However, the invention is not necessarily limited to such a construction. If no substantial deterioration in vehicular performance is caused even though one of the temperatures is not equal to or higher than the corresponding one of the predetermined values, it is not indispensable to regard that temperature as a factor requiring prohibition of the performance of neutral control. If there is another member that causes a deterioration in vehicular performance through the performance of neutral control, it is possible to adopt a construction in which the performance of neutral control is prohibited in accordance with a predetermined condition which concerns that member and which threatens to cause a deterioration in vehicular performance.

The aforementioned embodiment deals with a case where the performance of neutral control is prohibited on the basis of detection of at least one of a factor threatening to hinder the performance of cooperative control and a factor threatening to cause a deterioration in vehicular performance through the performance of neutral control. However, the invention is not limited to this construction. If a deterioration in vehicular performance causes no problem, it is possible to adopt a construction in which this deterioration is not considered as a factor requiring prohibition of the performance of neutral control. Further, the foregoing description refers to prohibiting the performance of neutral control if at least one of two conditions for prohibiting the performance of neutral control, namely, a factor threatening to hinder the performance of cooperative control and a factor threatening to cause a deterioration in vehicular performance through the performance of neutral control is detected. However, it is also appropriate that the performance of neutral control be prohibited on the basis of only one of the two conditions.

According to the construction described in the aforementioned embodiment, the performance of neutral control is prohibited when a predetermined condition regarding the engine control associated with cooperative control is fulfilled. However, it is also possible to adopt a construction in which the performance of neutral control is prohibited when a predetermined condition regarding another engine control that is not associated with cooperative control is fulfilled.

In the aforementioned embodiment, power of the internal combustion engine that is installed in the vehicle as a power source is transmitted to the driving wheels via the automatic transmission, and neutral control is performed for the automatic transmission. However, the invention is not necessarily limited to such a construction. It is also possible to adopt a construction in which the performance of the aforementioned neutral control is prohibited when a predetermined condition regarding operating-mode control performed for another power source which is not an internal combustion engine and which is installed in a vehicle is fulfilled.

In the aforementioned embodiment, the AT 20, namely, the automatic transmission is provided with a fluid clutch. However, the invention is not necessarily limited to such a construction. The invention is also applicable to other vehicles in which a driving force generated by a power source is transmitted to driving wheels via an automatic transmission whose power transmission efficiency is variable and which is not necessarily provided with a fluid clutch.

What is claimed is:

1. A vehicular control device for a vehicle in which a driving force generated by a power source is transmitted to driving wheels via an automatic transmission whose power transmission efficiency is variable, comprising:

an operating-mode control controller that controls an operating mode for the power source;

a neutral control performance controller that controls, for the automatic transmission, performance of neutral control for rendering an input frictional engagement element of the transmission in a released or slipping state when the vehicle is stopped while being in a running range in which a driving force delivered from the power source is transmitted to the driving wheels by the automatic transmission; and a neutral control performance prohibition controller that controls prohibition of performance of the neutral control for the automatic transmission on the basis of a predetermined condition regarding operating-mode control performed for the power source, wherein the power source is an internal combustion engine, wherein cooperative control for adjusting an increase or decrease in output of the engine in accordance with a load required for the driving wheels in the vehicle is performed in the operating-mode control controller, and the predetermined condition regarding the operating-mode control is determined on the basis of detection of a factor threatening to hinder performance of the cooperative control during performance thereof, and wherein the factor threatening to hinder performance of the cooperative control is deterioration in performance of an engine valve open-close timing change mechanism that adjusts timings for opening or closing engine valves for actuating the engine.

2. The vehicular control device according to claim 1, wherein:

the automatic transmission is provided with a fluid clutch; and a power transmission efficiency of the automatic transmission can be changed by adjusting an amount of fluid to be contained in the fluid clutch.

3. A vehicular control device for a vehicle in which a driving force generated by a power source is transmitted to driving wheels via an automatic transmission whose power transmission efficiency is variable, comprising:

an operating-mode control controller that controls an operating mode for the power source;

a neutral control performance controller that controls, for the automatic transmission, performance of neutral control for rendering an input frictional engagement element of the transmission in a released or slipping state when the vehicle is stopped while being in a running range in which a driving force delivered from the power source is transmitted to the driving wheels by the automatic transmission; and a neutral control performance prohibition controller that controls prohibition of performance of the neutral control for the automatic transmission on the basis of a predetermined condition regarding operating-mode control performed for the power source, wherein the power source is an internal combustion engine, wherein cooperative control for adjusting an increase or decrease in output of the engine in accordance with a load required for the driving wheels in the vehicle is performed in the operating-mode control controller, and the predetermined condition regarding the operating-mode control is determined on the basis of detection of a factor threatening to hinder performance of the cooperative control during performance thereof, and wherein the neutral control performance prohibition controller abstains from prohibiting performance of the neutral control if a factor threatening to cause a deterioration in vehicular performance through performance of the neutral control has not been detected even in the case where a factor threatening to hinder performance of the cooperative control has been detected.

4. The vehicular control device according to claim 3, wherein:

the automatic transmission is provided with a fluid clutch; and a power transmission efficiency of the automatic transmission can be changed by adjusting an amount of fluid to be contained in the fluid clutch.

5. A vehicular control device for a vehicle in which a driving force generated by a power source is transmitted to driving wheels via an automatic transmission whose power transmission efficiency is variable, comprising:

an operating-mode control controller that controls an operating mode for the power source;

a neutral control performance controller that controls, for the automatic transmission, performance of neutral control for rendering an input frictional engagement element of the transmission in a released or slipping state when the vehicle is stopped while being in a running range in which a driving force delivered from the power source is transmitted to the driving wheels by the automatic transmission; and a neutral control performance prohibition controller that prohibits performance of the neutral control for the automatic transmission on the condition that a factor threatening to cause a deterioration in vehicular performance through performance of the neutral control be detected, wherein the power source is an internal combustion engine, and wherein the factor threatening to cause a deterioration in vehicular performance is determined on the basis of at least one of a bed temperature of a catalyst disposed in an exhaust passage of the internal combustion engine so as to purify exhaust gas flowing through the exhaust passage and a temperature of coolant for cooling the engine.

6. The vehicular control device according to claim 5, wherein:

the automatic transmission is provided with a fluid clutch; and a power transmission efficiency of the automatic transmission can be changed by adjusting an amount of fluid to be contained in the fluid clutch.

7. A vehicular control method for a vehicle in which a driving force generated by a power source is transmitted to driving wheels via an automatic transmission whose power transmission efficiency is variable, comprising the steps of:

controlling an operating mode for the power source;

controlling a performance of a neutral control, for the automatic transmission, the neutral control for rendering an input frictional engagement element of the transmission in a released or slipping state when the vehicle is stopped while being in a running range in which a driving force delivered from the power source is transmitted to the driving wheels by the automatic transmission; and controlling a prohibition of performance of the neutral control for the automatic transmission on the basis of a predetermined condition regarding operating-mode control performed for the power source, wherein the power source is an internal combustion engine, wherein cooperative control for adjusting an increase or decrease in output of the internal combustion engine in accordance with a load required for the driving wheels in the vehicle is performed in the step of controlling an operating mode, and the predetermined condition regarding the operating-mode control is determined on the basis of detection of a factor threatening to hinder performance of the cooperative control during performance thereof, and wherein the factor threatening to hinder performance of the cooperative control is a deterioration in performance of an engine valve open-close timing change mechanism that adjusts timings for opening or closing engine valves for actuating the engine.

8. The vehicular control method according to claim 7, wherein:

the automatic transmission is provided with a fluid clutch; and a power transmission efficiency of the automatic transmission can be changed by adjusting an amount of fluid to be contained in the fluid clutch.

9. A vehicular control method for a vehicle in which a driving force generated by a power source is transmitted to driving wheels via an automatic transmission whose power transmission efficiency is variable, comprising the steps of:

controlling an operating mode for the power source;

controlling a performance of a neutral control, for the automatic transmission, the neutral control for rendering an input frictional engagement element of the transmission in a released or slipping state when the vehicle is stopped while being in a running range in which a driving force delivered from the power source is transmitted to the driving wheels by the automatic transmission; and controlling a prohibition of performance of the neutral control for the automatic transmission on the basis of a predetermined condition regarding operating-mode control performed for the power source, wherein the power source is an internal combustion engine, wherein cooperative control for adjusting an increase or decrease in output of the internal combustion engine in accordance with a load required for the driving wheels in the vehicle is performed in the step of controlling an operating mode, and the predetermined condition regarding the operating-mode control is determined on the basis of detection of a factor threatening to hinder performance of the cooperative control during performance thereof, and wherein prohibition of performance of the neutral control is abstained from in the step of controlling prohibition of performance of the neutral control, if a factor threatening to cause a deterioration in vehicular performance through performance of the neutral control has not been detected even in the case where a factor threatening to hinder performance of the cooperative control has been detected.

10. The vehicular control method according to claim 9, wherein:

the automatic transmission is provided with a fluid clutch; and a power transmission efficiency of the automatic transmission can be changed by adjusting an amount of fluid to be contained in the fluid clutch.

11. A vehicular control method for a vehicle in which a driving force generated by a power source is transmitted to driving wheels via an automatic transmission whose power transmission efficiency is variable, comprising the steps of:

controlling an operating mode for the power source;

controlling a performance of a neutral control, for the automatic transmission, neutral control for rendering an input frictional engagement element of the transmission in a released or slipping state when the vehicle is stopped while being in a running range in which a driving force delivered from the power source is transmitted to the driving wheels by the automatic transmission; and controlling a prohibition of performance of the neutral control for the automatic transmission on the condition that a factor threatening to cause a deterioration in vehicular performance through performance of the neutral control be detected, wherein the power source is an internal combustion engine, and wherein the factor threatening to cause a deterioration in vehicular performance is determined on the basis of at least one of a bed temperature of a catalyst disposed in an exhaust passage of the internal combustion engine so as to purify exhaust gas flowing through the exhaust passage and a temperature of coolant for cooling the engine.

12. The vehicular control method according to claim 11, wherein:

the automatic transmission is provided with a fluid clutch; and a power transmission efficiency of the automatic transmission can be changed by adjusting an amount of fluid to be contained in the fluid clutch.

* * * * *